US012761499B2

(12) United States Patent
Park

(10) Patent No.: US 12,761,499 B2
(45) Date of Patent: Oct. 13, 2026

(54) EYEWEAR WITH ADJUSTABLE NOSE SUPPORT ANGLE IN VARIOUS DIRECTION

(71) Applicant: KOREA O.G.K CO., LTD., Wonju-si (KR)

(72) Inventor: Soo An Park, Seongnam-si (KR)

(73) Assignee: KOREA O.G.K CO., LTD., Wonju-si (KR)

( * ) Notice: Subject to any disclaimer, the term of this patent is extended or adjusted under 35 U.S.C. 154(b) by 244 days.

(21) Appl. No.: 18/660,975

(22) Filed: May 10, 2024

(65) Prior Publication Data

US 2025/0321435 A1 Oct. 16, 2025

(30) Foreign Application Priority Data

Apr. 15, 2024 (KR) ........................ 10-2024-0050111

(51) Int. Cl.
*G02C 5/12* (2006.01)

(52) U.S. Cl.
CPC .................................... *G02C 5/122* (2013.01)

(58) Field of Classification Search
CPC ......... G02C 5/122; G02C 5/124; G02C 5/126
USPC ......................................... 351/137, 138, 139
See application file for complete search history.

(56) References Cited

U.S. PATENT DOCUMENTS 2,501,259 A * 3/1950 Brandt ................... G02C 5/122 351/76
7,472,991 B1 * 1/2009 Chen ...................... G02C 5/122 351/137
2009/0021691 A1 * 1/2009 Yang ...................... G02C 5/122 351/137
2015/0049298 A1 * 2/2015 Chen ...................... G02C 5/122 351/137
2015/0205144 A1 * 7/2015 Chin ...................... G02C 5/122 351/137
2016/0103332 A1 * 4/2016 Lin ........................ G02C 5/126 351/110
2018/0252938 A1 * 9/2018 Thorsell ................... G02C 1/04

FOREIGN PATENT DOCUMENTS

CN 202854420 U 4/2013
CN 220584493 U 3/2024
JP 3421775 B2 6/2003
KR 200347241 Y1 4/2004
KR 10-2027312 B1 10/2019

(Continued)

*Primary Examiner* — Darryl J Collins
(74) *Attorney, Agent, or Firm* — Dinsmore & Shohl LLP

(57) ABSTRACT

Disclosed is eyewear with an adjustable nose support angle in various directions, and the eyewear includes: a lens; a frame coupled to a portion of a periphery of the lens; a nose support frame formed by extending the frame from a center bottom of the lens or formed by being coupled to the lens; a coupling portion comprising a plurality of coupling shaft that extend from the nose support frame to protrude toward a user's face, extend in a vertical direction, and are spaced apart from each other; an adjustment tip coupled to the coupling portion to be movable in the vertical direction along the coupling shaft of the coupling portion, and rotating horizontally about the coupling shaft; and a nose support pad coupled to the adjustment tip and movable according to vertical movement and horizontal rotation of the adjustment tip.

13 Claims, 18 Drawing Sheets

(56) References Cited

FOREIGN PATENT DOCUMENTS

| | | | |
|---|---|---|---|
| KR | 10-2478658 | B1 | 6/2022 |
| KR | 10-2022-0137625 | A | 10/2022 |
| KR | 10-2023-0077391 | A | 6/2023 |
| KR | 10-2023-0153754 | A | 11/2023 |

* cited by examiner

【FIGURE 1】
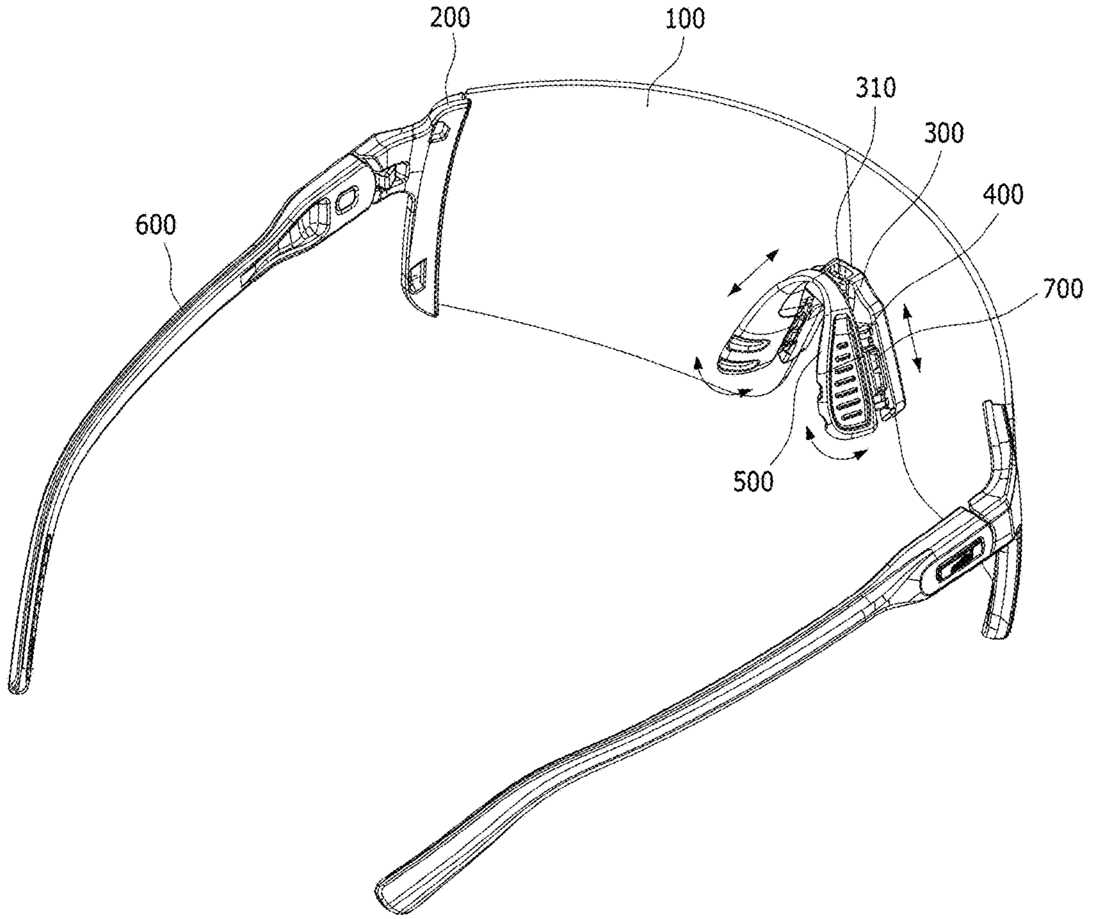

【FIGURE 2】
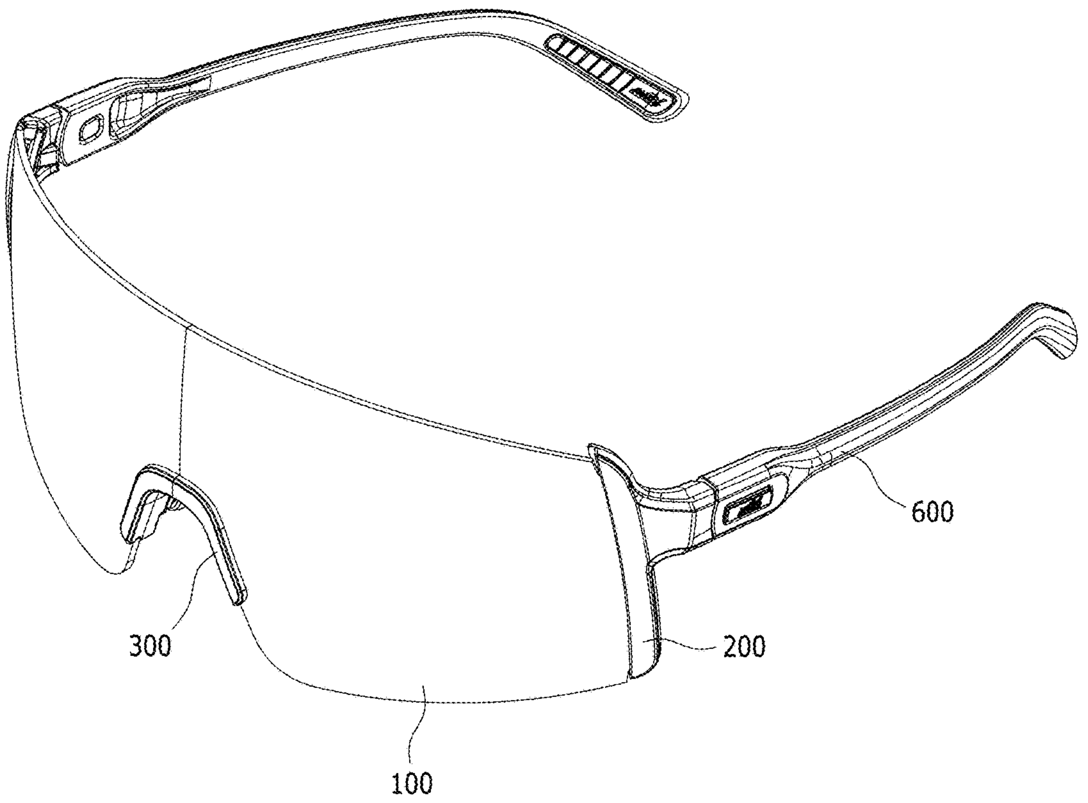

【FIGURE 3】
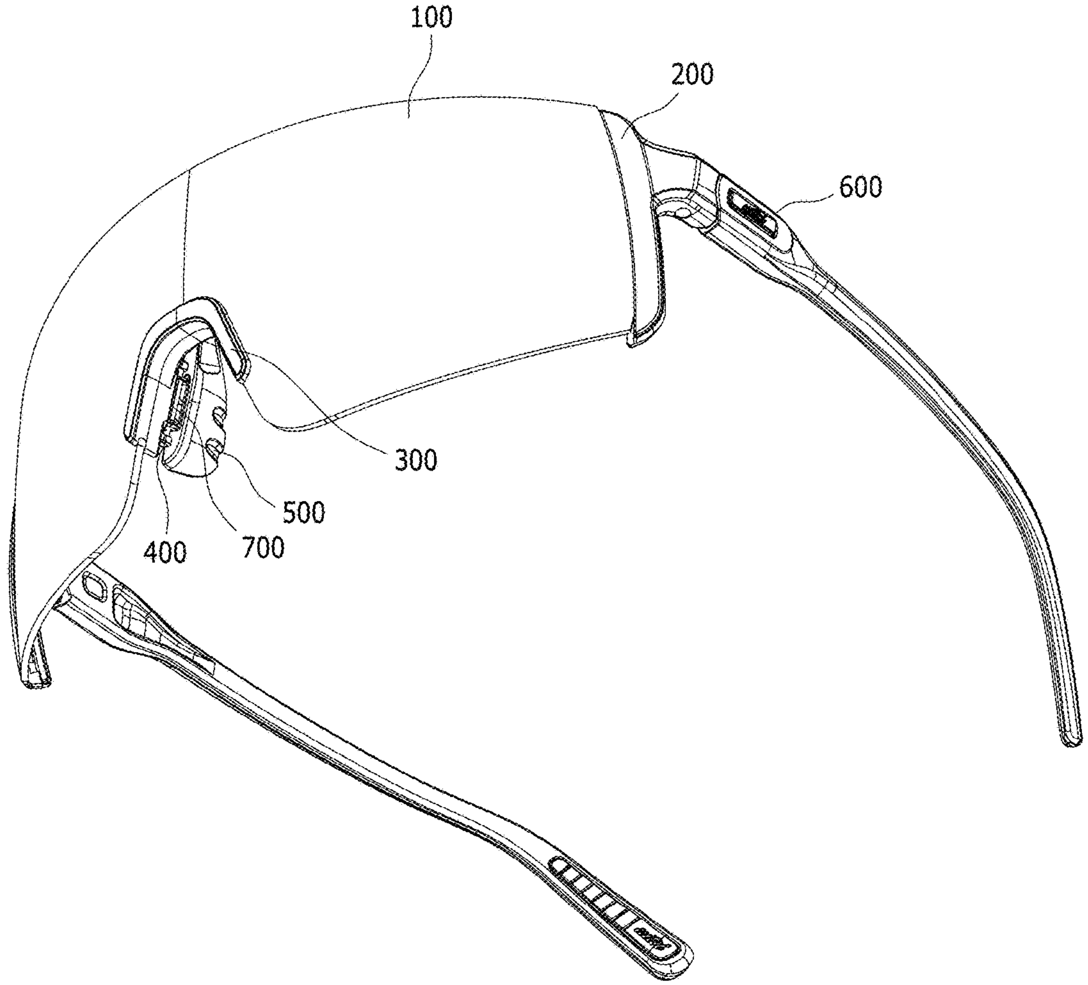

【FIGURE 4】
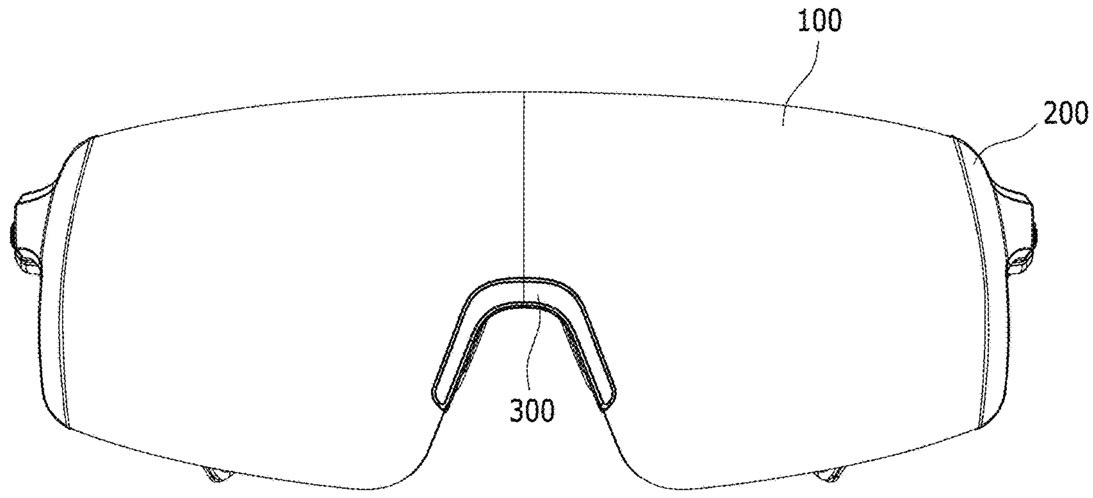

【FIGURE 5】
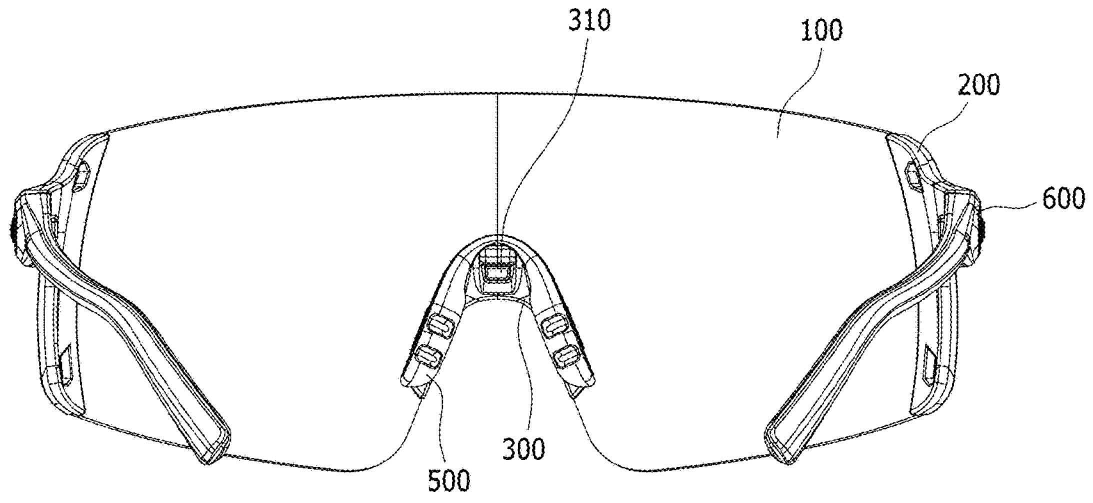

【FIGURE 6】
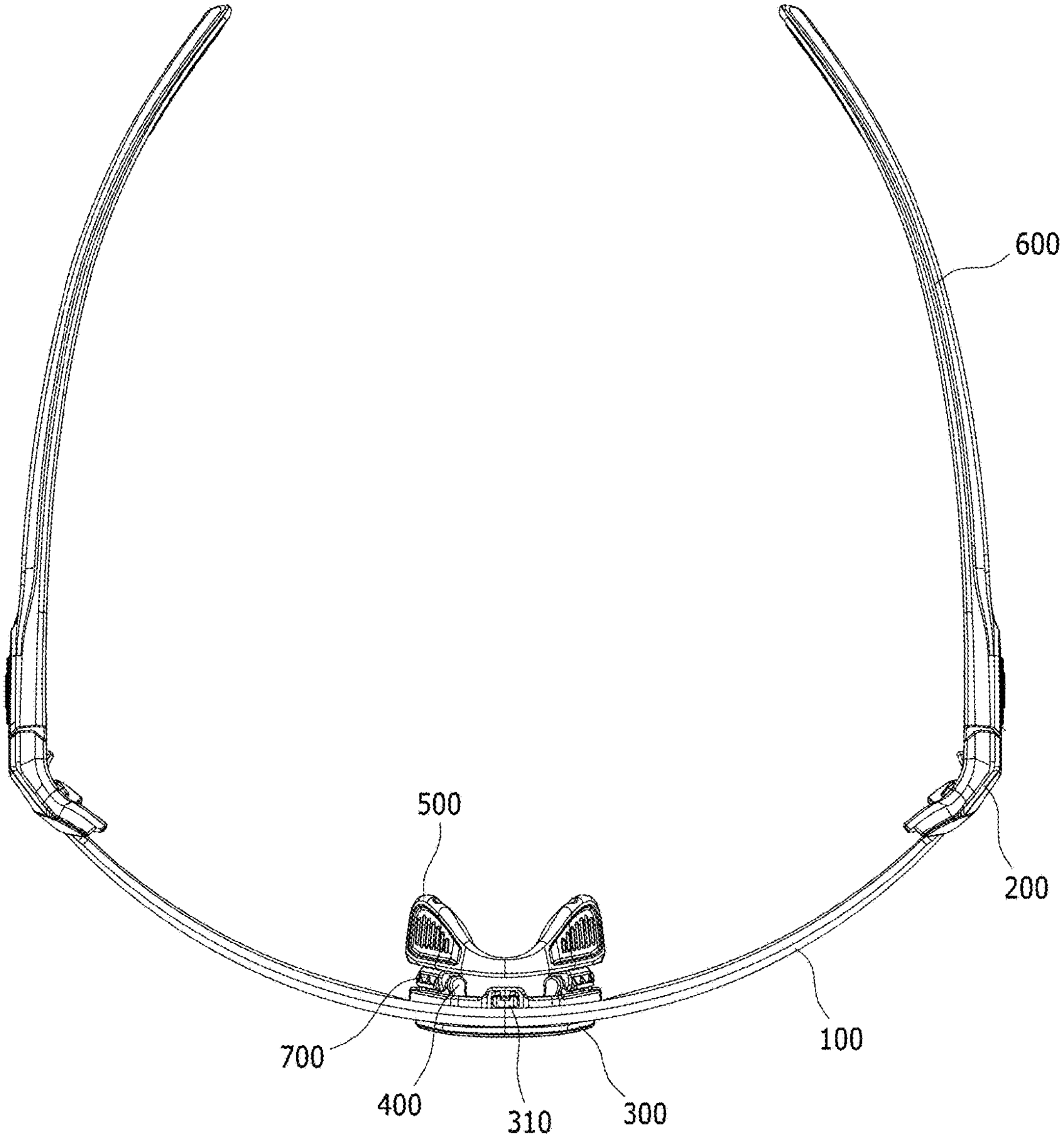

【FIGURE 7】
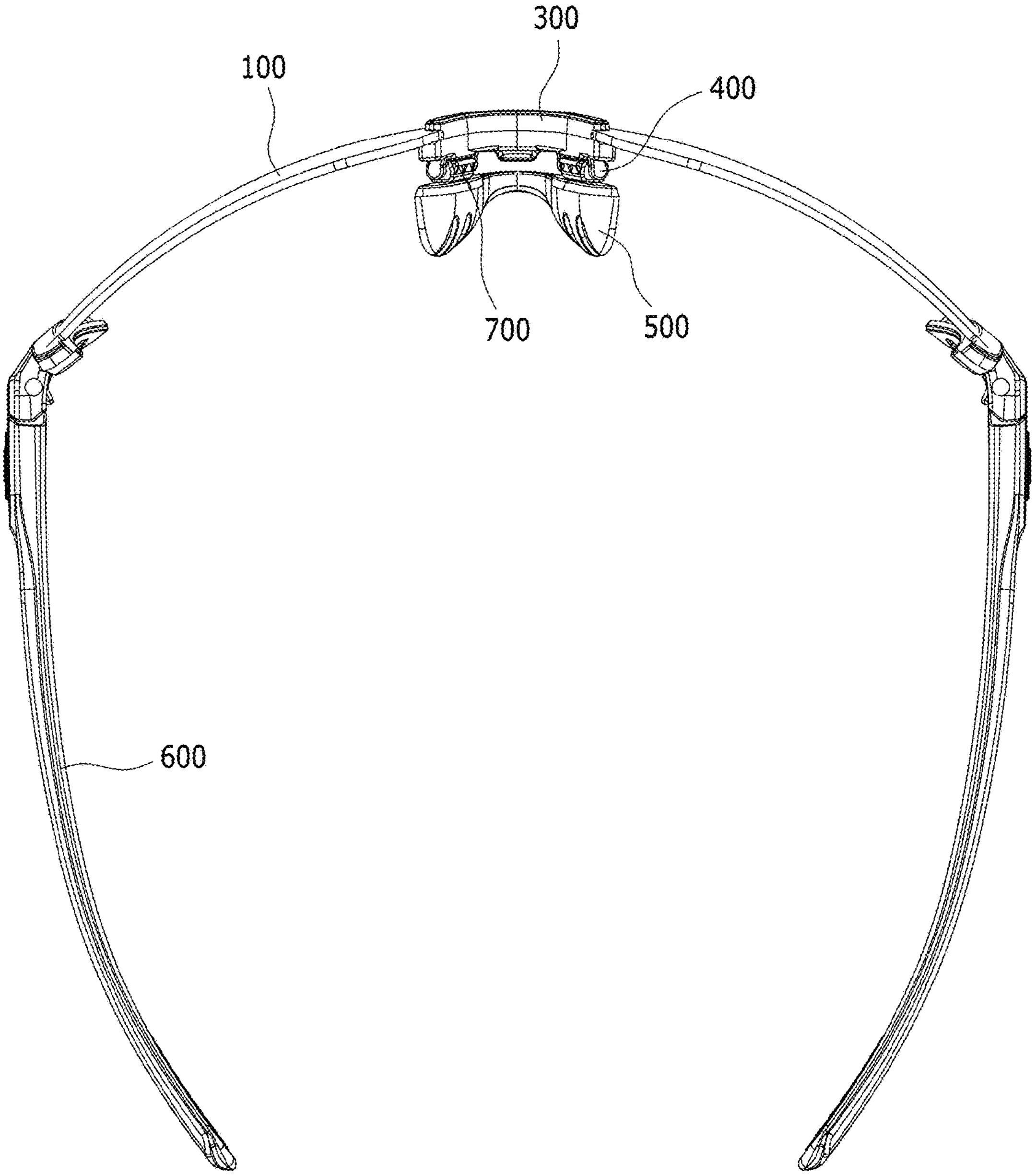

【FIGURE 8】
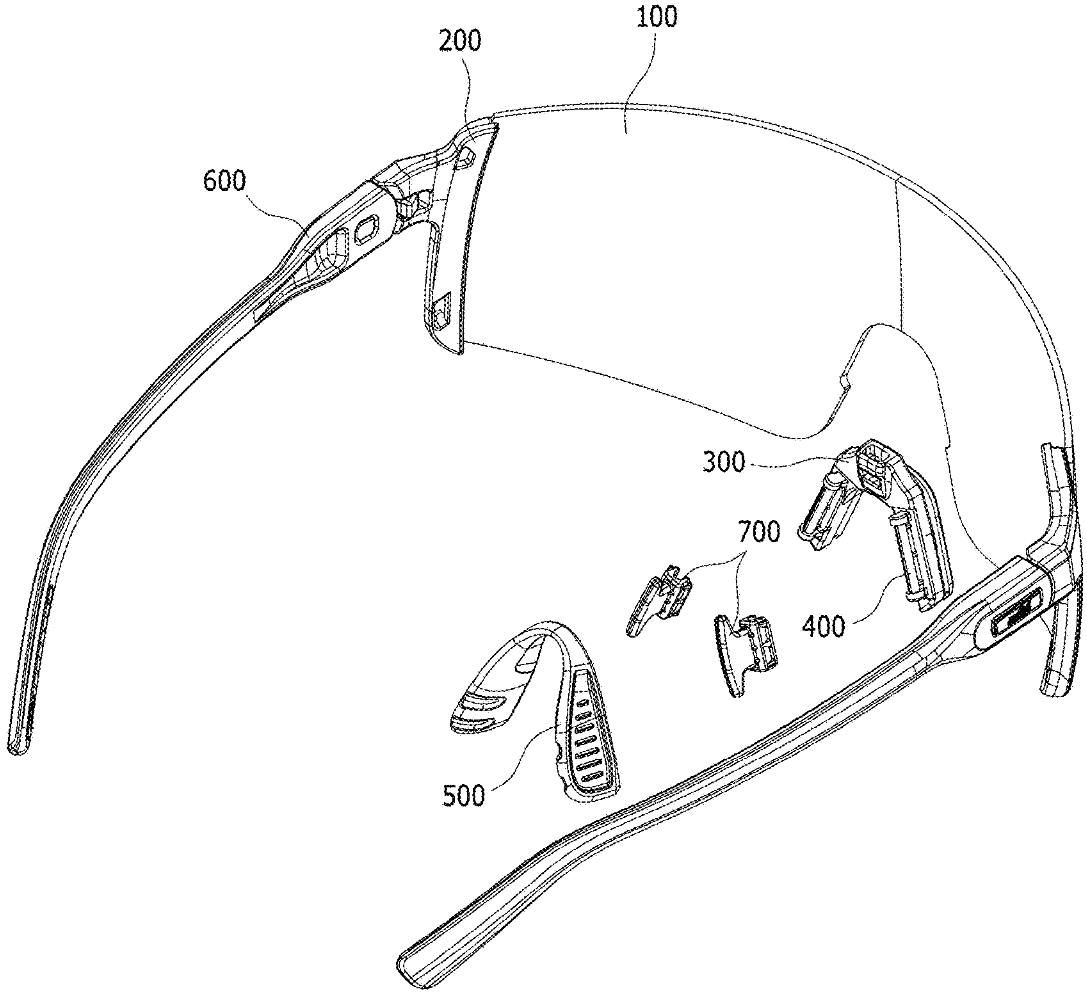

【FIGURE 9】
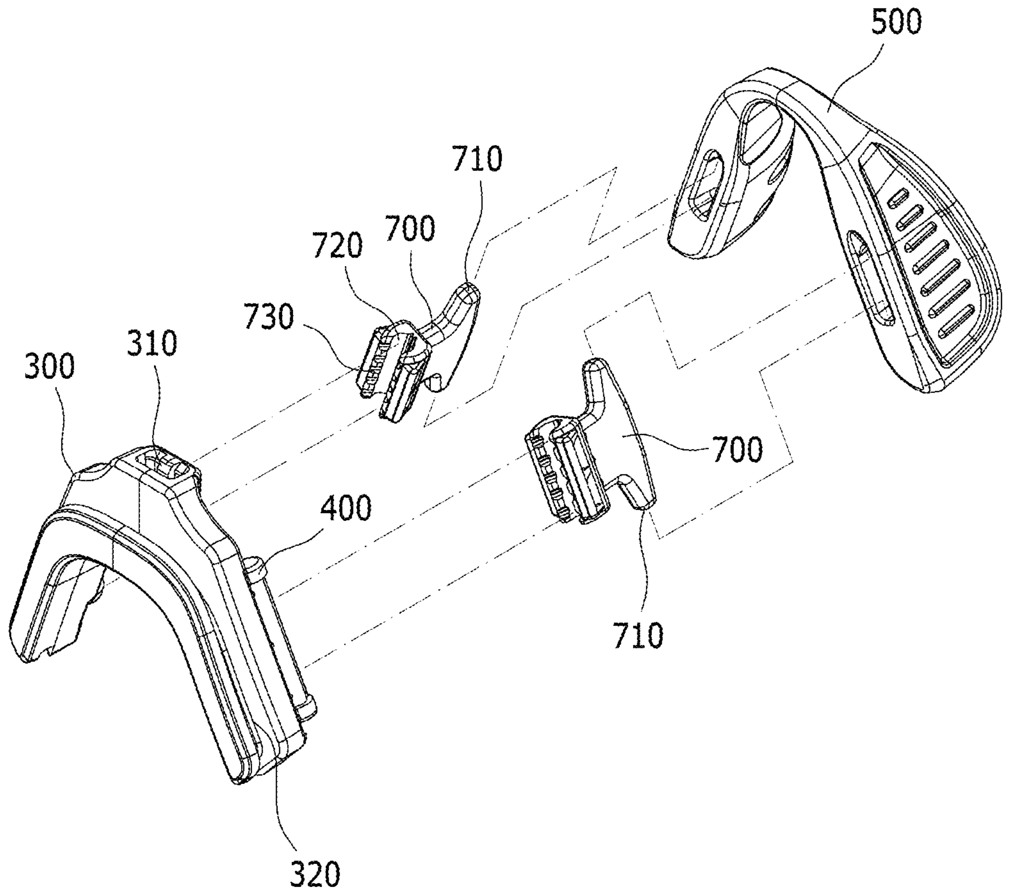

【FIGURE 10】
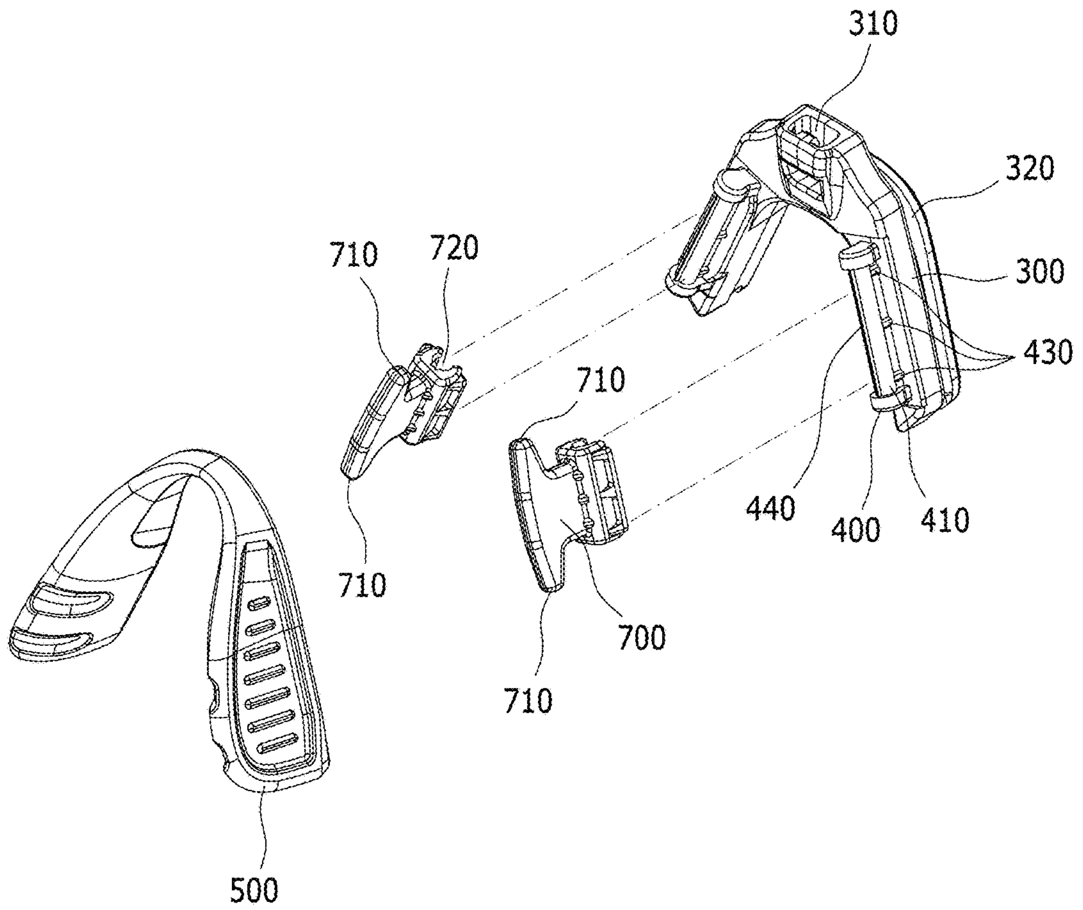

【FIGURE 11】
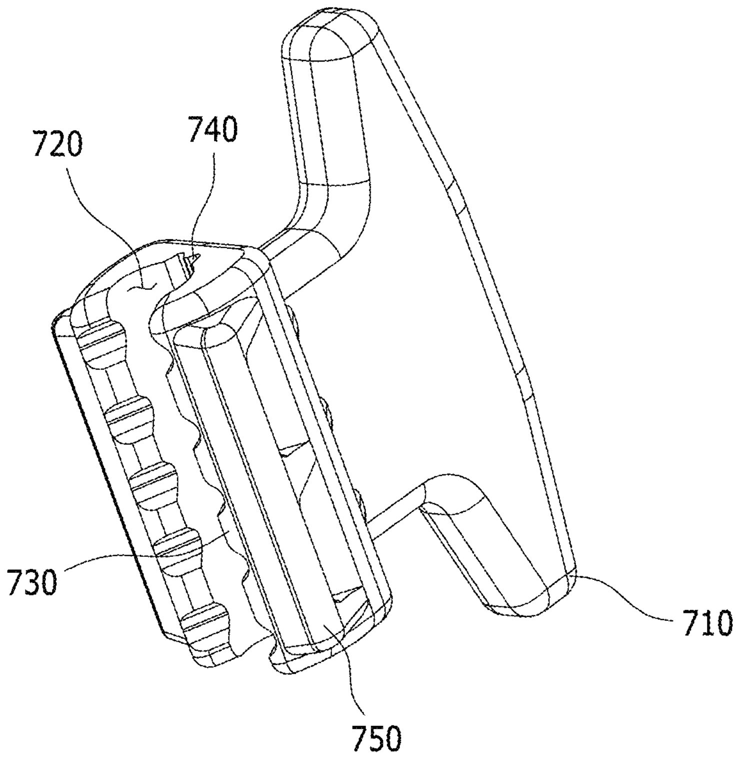

【FIGURE 12】
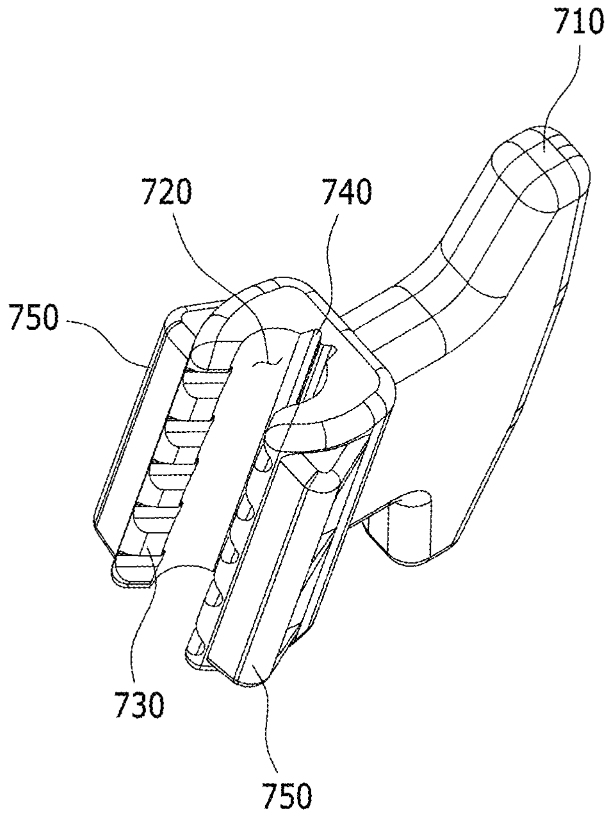

【FIGURE 13】
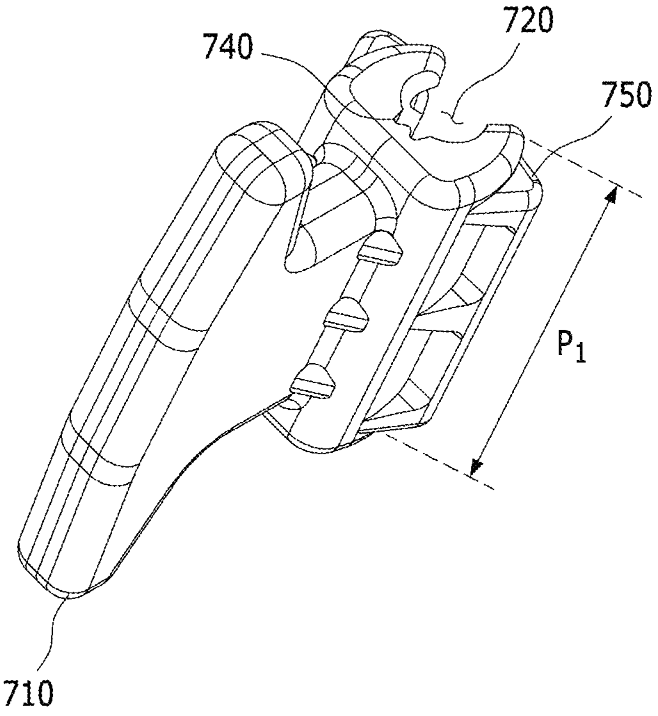

【FIGURE 14】
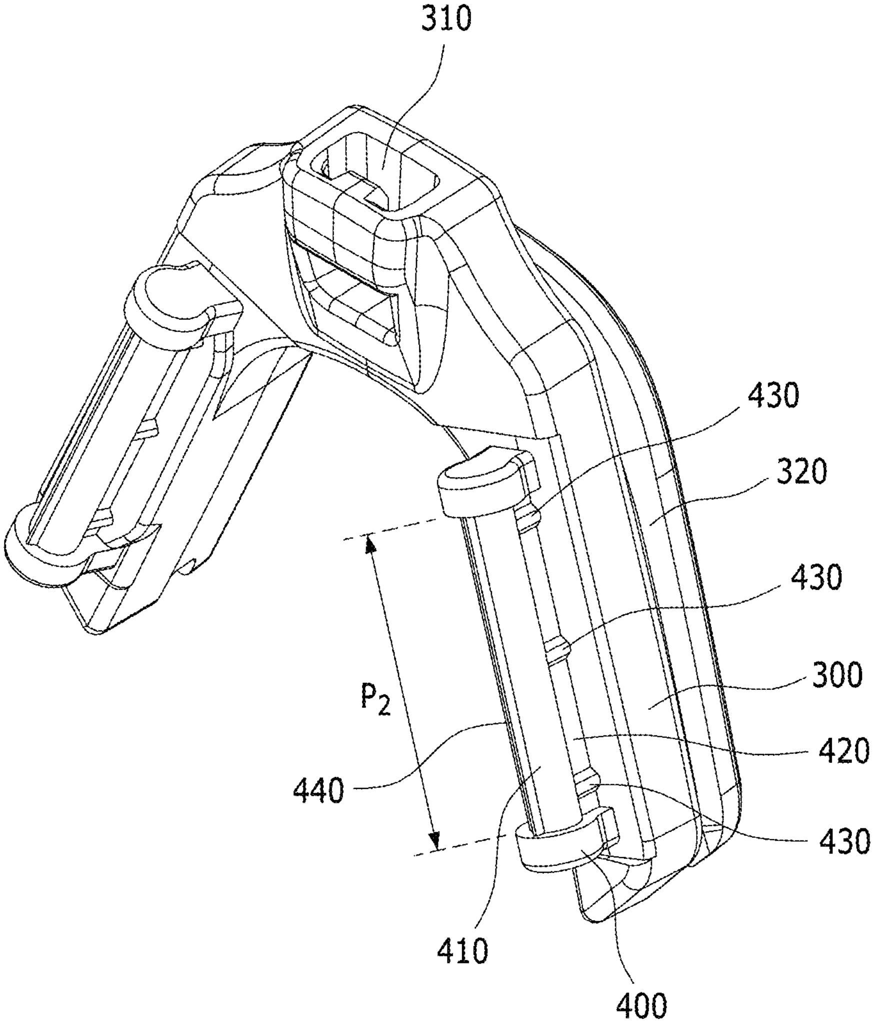

【FIGURE 15】
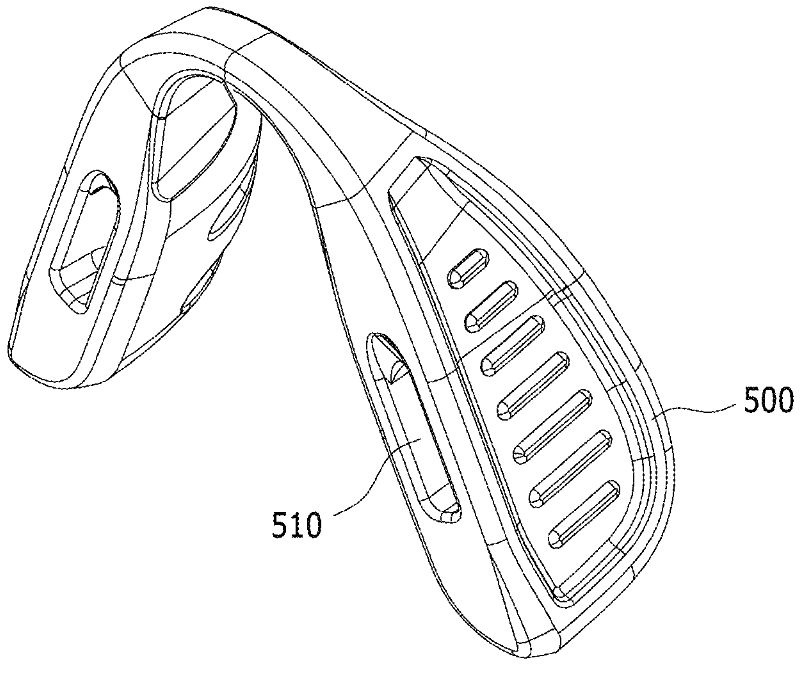

【FIGURE 16】
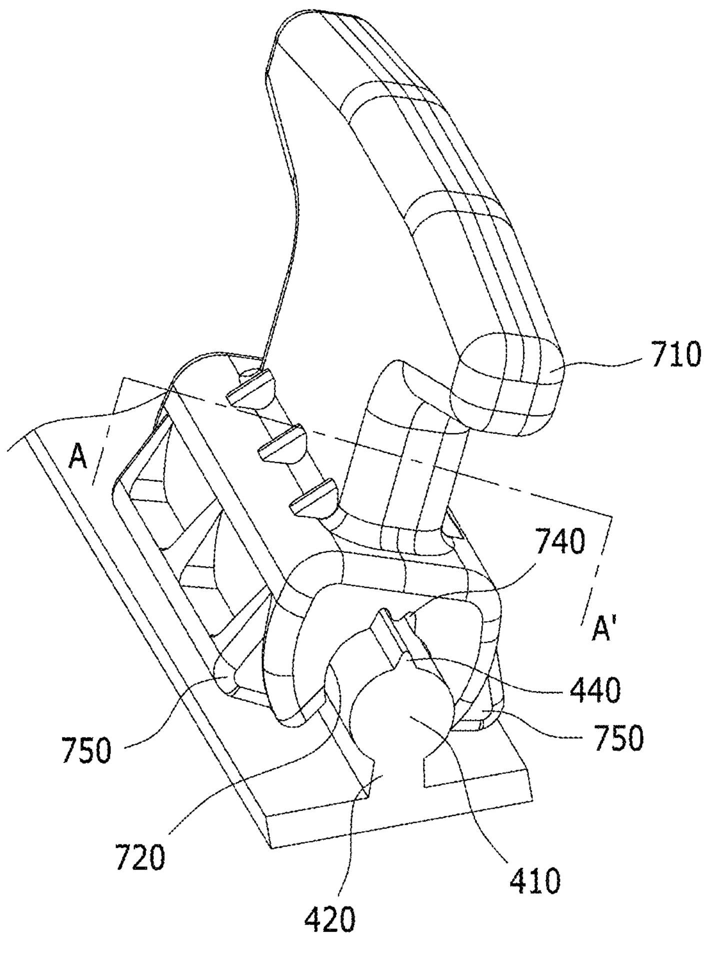

【FIGURE 17】
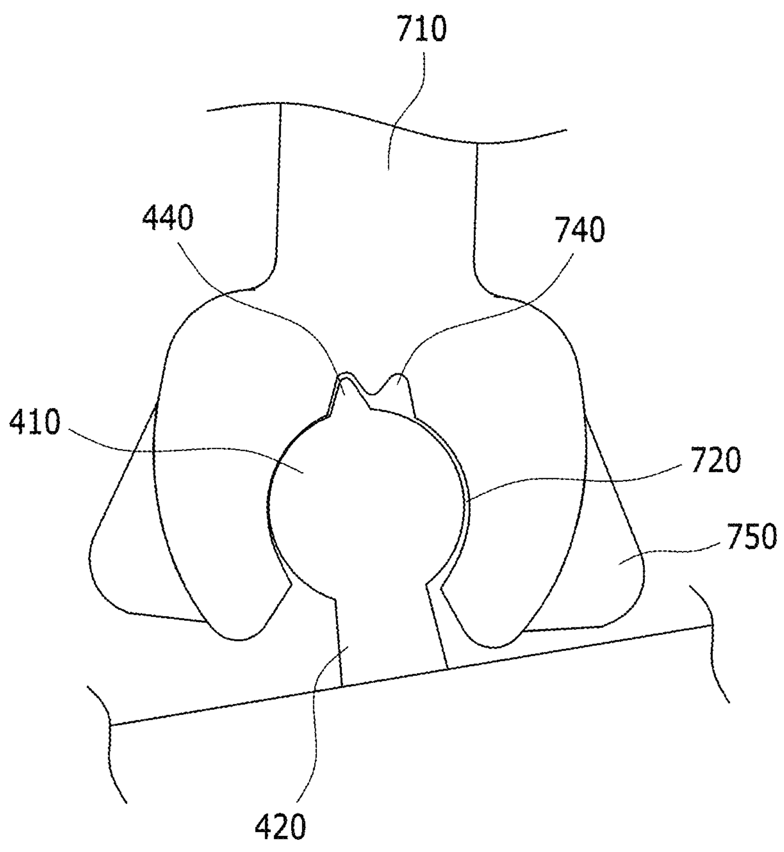

【FIGURE 18】
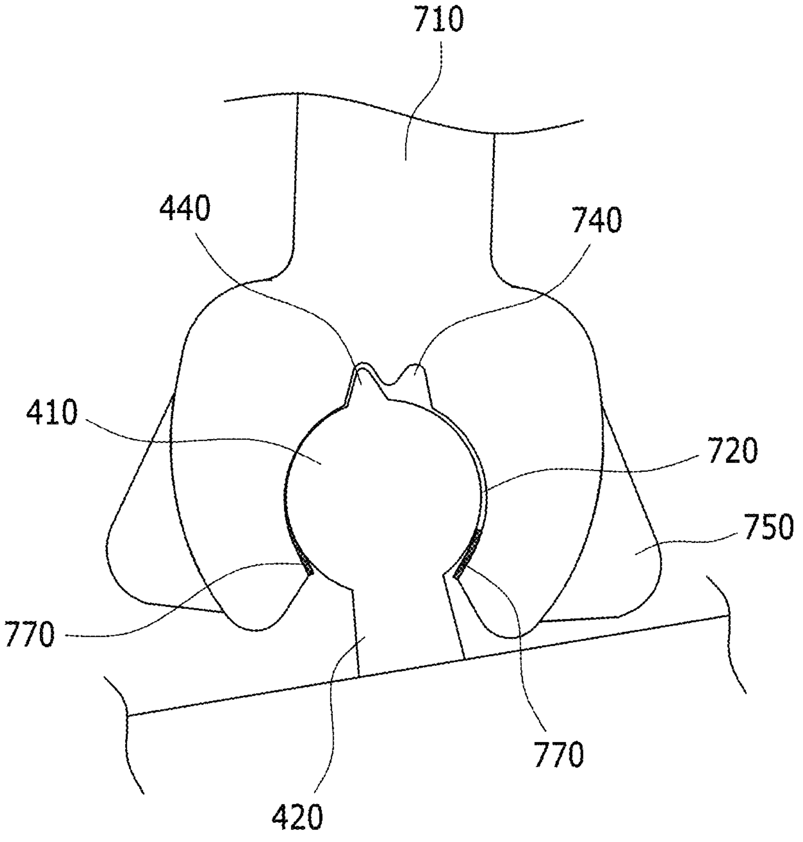

EYEWEAR WITH ADJUSTABLE NOSE SUPPORT ANGLE IN VARIOUS DIRECTION

CROSS REFERENCE TO RELATED APPLICATION

This application claims priority from Republic of Korea Patent Application No. 10-2024-0050111, filed on Apr. 15, 2024, which is hereby incorporated by reference in its entirety.

BACKGROUND

Field

The present disclosure relates to eyewear that allows an angle of a nose support to be adjusted in various directions.

Related Art

Eyewear includes not only general glasses made of transparent materials with customized refractive indices, but also products such as sunglasses and goggles designed to diminish light transmission, safeguarding a user's eyes against glare and UV rays. Typically, sunglasses are manufactured using transparent materials with added colorants or coatings that reflect light, aiming to reduce glare and protect the user's eyes from UV radiation.

Meanwhile, eyewear generally consists of transparent or tinted lens parts supported by a frame, temples attached to the frame to secure the eyewear to the user's ears, and a nose support to support the eyewear on the user's nose, ensuring a proper fit on the face.

People who wear eyewear have various face shapes and sizes, often finding that mass-produced ready-made items don't fit well or are uncomfortable. Furthermore, there's often difficulty in finding eyewear that matches one's personal style preferences.

Conventionally, eyewear have been mass-produced with a uniform shape and angle, not tailored to individual wearers. Thus, users adapt to the eyewear rather than having eyewear adjusted to fit them.

Therefore, there's a demand for new features that allow eyewear to be adjusted in various directions, catering to different face shapes and sizes. Researches are needed to develop eyewear that can be optimized and adjusted to fit various facial shapes.

PRIOR ART DOCUMENT

Patent Document (Patent Document 0001) Korean Patent Application Publication No. 10-2478658 (Published on Dec. 19, 2022)

SUMMARY

The present disclosure provide eyewear that allows a user to conveniently adjust an angle of a nose support part according to the user's preferences, so that the user wears the eyewear comfortably in a desired manner or to fit the user's face shape.

The present disclosure also provide eyewear that is suitable for both Western and Asian facial shapes even in the case of a mass-produced standardized product.

The present disclosure also provide eyewear that allows easy adjustment of a nose support angle for convenient use even when wearing a separate prescription lens.

The present disclosure also provide eyewear that securely fixes an angle maintained by a nose support even after adjustment of the angle, preventing any unintended change in angle by a user.

The present disclosure also provide eyewear that facilitates convenient mass production of the aforementioned eyewear.

Object of the present disclosure are not limited to the objects mentioned above, and other objects not mentioned will be clearly understood by those skilled in the art from the description below.

In one general aspect, there is provided eyewear including: a lens; a frame coupled to a portion of a periphery of the lens; a nose support frame formed by extending the frame from a center bottom of the lens or formed by being coupled to the lens; a coupling portion comprising a plurality of coupling shaft that extend from the nose support frame to protrude toward a user's face, extend in a vertical direction, and are spaced apart from each other; an adjustment tip coupled to the coupling portion to be movable in the vertical direction along the coupling shaft of the coupling portion, and rotating horizontally about the coupling shaft; and a nose support pad coupled to the adjustment tip and movable according to vertical movement and horizontal rotation of the adjustment tip.

One end of the adjustment tip may be coupled to the coupling shaft, and the other end is coupled to the nose support pad, and the other end of the adjustment tip further may include a pad fixing part protruding in the vertical direction and inserted into an inner space of the nose support pad to fix the nose support pad.

The plurality of coupling shaft of the coupling portion may protrude from both ends of the nose support frame toward the user's face, sloping from top to bottom, and the coupling shafts may oppose each other and be symmetrical to a virtual line crossing a center of the lens in the vertical direction and spaced apart with an increasing distance therebetween from top to bottom.

The coupling portion may include a connecting portion that connects the coupling shaft and the nose support frame at a distance, with a thickness smaller than a thickness of the coupling shaft, and the adjustment tip may include a fitting portion formed as an empty space in a shape corresponding to a shape of the coupling shaft so as to fit to the coupling shaft.

An opening of the fitting portion into which the coupling shaft of the adjustment tip may be inserted has a width greater than a thickness of the connecting portion of the coupling portion.

The adjustment tip may further include stoppers formed by repeating a plurality of recessed areas on a surface facing the coupling shaft coupled to the fitting portion, and the coupling part may further include an angle adjuster formed to protrude from the coupling shaft and be inserted into any one of the stoppers.

At a position where the adjustment tip and the coupling shaft are coupled to each other, the angle adjuster and the stopping part may be disposed inside the fitting portion to face each other.

The adjustment tip may further include a stopper protruding from a surface facing the coupling shaft coupled to the fitting portion, the coupling portion may further include angle adjusters formed by repeatedly forming a plurality of recessed areas on the surface of the coupling shaft, and the stopper may be inserted into any one of the angle adjusters so that an angle of the adjustment tip is adjusted by moving the stopper between the angle adjusters.

The adjustment tip may further include rotation stoppers formed at both ends of the fitting portion to stop rotation of the adjustment tip when one end of the adjustment tip contacts the nose support frame, and a thickness of the rotation stoppers may increase toward a position facing the coupling portion.

A surface of the rotation stopper where one end of the adjustment tip contacts the nose support frame may be larger than an area formed by a cross section of a top.

A vertical length of the adjustment tip coupled to the coupling shaft may be smaller than a vertical length formed by the coupling shaft.

The adjustment tip may be movable upward and downward along the coupling shaft.

The adjustment tip may further include a plurality of adjustment steps spaced apart from each other and recessed, the coupling portion may further include a protruding stopping projection to be inserted into one of the adjustment steps, and a position of the adjustment tip may be adjusted in the vertical direction by the stopping projection.

The stopping projection may be inserted complementarily into a first adjustment step among the plurality of adjustment steps, the adjustment tip may be moved and secured to a lower position as the stopping projection is moved and fixed to a second adjustment step spaced apart from above the first adjustment step, and the adjustment tip may be moved and secured to a higher position as the stopping projection is moved and fixed to a third adjustment step spaced apart from below the first adjustment step.

The adjustment tip may further include a pad portion coupled to an inner surface of the adjustment tip, forming the fitting portion, and disposed between the inner surface of the coupling portion and a surface of the coupling shaft, and the pad portion may be moved in contact with the coupling shaft when the adjustment tip is rotated.

Specific details of other embodiments are included in the detailed description and drawings.

According to embodiments of the present disclosure, there are at least the following effects.

In the eyewear according to the present disclosure, it is possible for a user to conveniently adjust an angle of a nose support according to the user's preferences, so that the user wears the eyewear comfortably in a desired manner or to fit the user's face shape.

In addition, even if a standardized product is produced through mass production, it can be used appropriately for both Western and Asian face shapes.

In addition, it is possible to enable easy adjustment of a nose support angle for convenient use even when wearing a separate prescription lens.

In addition, it is possible to securely fix an angle maintained by a nose support even after adjustment of the angle, preventing any unintended change in angle by a use.

Additionally, it is possible to facilitate convenient mass production of the aforementioned eyewear.<

Effects according to the present disclosure are not limited to the effects mentioned above, and other various effects are included in the present specification.

BRIEF DESCRIPTION OF THE DRAWINGS

FIG. 1 is a perspective view of eyewear according to an embodiment of the present disclosure, from a direction in which the user wears the eyewear.

FIG. 2 is a perspective view of eyewear according to an embodiment of the present disclosure, from the outside towards the user.

FIG. 3 is a perspective view of eyewear according to an embodiment of the present disclosure from another angle.

FIG. 4 is a front view of eyewear according to an embodiment of the present disclosure.

FIG. 5 is a rear view of eyewear according to an embodiment of the present disclosure.

FIG. 6 is a plan view of eyewear according to an embodiment of the present disclosure.

FIG. 7 is a bottom view of eyewear according to an embodiment of the present disclosure.

FIG. 8 is an exploded perspective view schematically showing eyewear according to an embodiment of the present disclosure.

FIG. 9 is an exploded perspective view schematically showing a portion of a nose support frame according to an embodiment of the present disclosure.

FIG. 10 is an exploded perspective view of a nose support frame according to an embodiment of the present disclosure, as seen from one angle.

FIG. 11 is a perspective view of an adjustment tip according to an embodiment of the present disclosure, as seen from one angle.

FIG. 12 is a perspective view of an adjustment tip according to an embodiment of the present disclosure, as seen from another angle.

FIG. 13 is a perspective view of an adjustment tip according to an embodiment of the present disclosure, as seen from yet another angle.

FIG. 14 is a perspective view of a nose support frame according to an embodiment of the present disclosure, as seen from one angle.

FIG. 15 is a perspective view of a nose support pad according to an embodiment of the present disclosure, as seen from one angle.

FIG. 16 is a perspective view showing a coupling relationship between a nose support frame and an adjustment tip according to an embodiment of the present disclosure.

FIG. 17 is a cross-sectional view taken along line A-A' of FIG. 16.

FIG. 18 is a cross-sectional view taken along line A-A' of FIG. 16 according to another embodiment.

DESCRIPTION OF EXEMPLARY EMBODIMENTS

Advantages and features of the present disclosure and a method of achieving the same should become clear with embodiments described in detail below with reference to the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. The present disclosure is defined by the scope of the claims. Like reference numerals refer to like elements throughout the specification. The size or the relative size of a layer or a region in the drawings may be exaggerated for the definiteness of explanation.

The spatially relative terms "below," "beneath," "lower," "under," "above," "upper," and the like, may be used herein for ease of description to describe the relations between one element or component and another element or component as illustrated in the drawings.

It will be understood that, although the terms first, second, third, etc., may be used herein to describe various elements, it should not be limited by these terms. These terms are only used to distinguish one element from another. For example, a first element may be referred to as a second element, without departing from the teachings of the present disclosure.

The eyewear of the present disclosure may be applied to eyeglasses, sunglasses, sports goggles, goggles for various purposes, and the like, wherein a nose support pad is applied to support the eyewear on a user's nose.

Hereinafter, embodiments of the present disclosure will be described with reference to the drawings.

FIG. 1 is a perspective view of eyewear according to an embodiment of the present disclosure as seen from an angle in which a user wears the eyewear, and FIG. 2 is a perspective view of eyewear according to an embodiment of the present disclosure, as seen from the outside toward a user; and FIG. 3 is a perspective view of eyewear according to an embodiment of the present disclosure, as seen from another angle.

Additionally, in order to show the eyewear of the present disclosure in more detail, FIG. 4 is a front view of eyewear according to an embodiment of the present disclosure; FIG. is a rear view of eyewear according to an embodiment of the present disclosure; FIG. 6 is a top view of the eyewear according to an embodiment of the present disclosure, and FIG. 7 is a bottom view of the eyewear according to an embodiment of the present disclosure.

Referring to FIGS. 1 to 7, eyewear according to an embodiment of the present disclosure includes: a lens 100; a frame 200 coupled to a portion of the periphery of the lens 100; a nose support frame 300 extending from a central bottom of the lens 100 or coupled to the lens 100; a coupling portion 400 comprising a plurality of coupling shafts 410 extending from the nose support frame 300 to protrude toward the user's face, extending in a vertical direction, and spaced apart from each other; an adjustment tip 700 coupled to the coupling portion 400 and movable the vertical direction along the coupling shafts 410 of the coupling portion 400, and rotating horizontally about the coupling shafts 410; and a nose support pad 500 coupled to the adjustment tip 700 and moving in accordance with vertical movement and horizontal rotation of the adjustment tip 700.

The lens 100 is placed in a position corresponding to the user's eyeball when the user is wearing the eyewear, and may be formed of a transparent material so that the user can see external objects. Optionally, the lens 100 may be formed to protect the user's eyes from strong light by including a colorant or attaching a colored film. Additionally, various additional elements such as UV absorbers, anti-fog treatments, etc., may be adopted. The lens 100 may be formed of glass, resin materials such as polycarbonate (PC), or various materials commonly used in the technical field to which the present disclosure pertains. Furthermore, the lens 100 may be in the form of lenses corresponding to the left and right eyes and coupled to the frame or may be integrally formed as shown in the drawings. However, the present disclosure is not particularly limited to either of them. If the lens 100 is integrally formed as shown in the drawings, a portion where the user's nose bridge is located may have a structure that is recessed from the bottom to the top.

The frame 200 may be coupled to a portion of the periphery of the lens 100 to secure and fix the lens 100, and the eyewear may be secured to the user's face through temple 600 coupled to the frame 200. The frame 200 may be coupled only to both ends of the lens 100 as shown in the drawings, thereby minimized in size, or may surround the entire periphery of the lens 100. In addition, various elements not specifically described may be combined with the frame 200. In other words, various methods commonly used in the art for coupling a lens to a frame may be applied in the present disclosure.

The temples 600 may be coupled to the frame 200 via a connecting member and may be typically coupled at both ends of the lens 100 to rest on the user's ears and secure the eyewear to the user's face. A temple 600 may be formed of various materials such as plastic resin, metal, and may be elongated toward the user's face to rest on the user's ears. In addition, a non-slip part formed of rubber or silicone material may be coupled to the temple 600 to prevent the eyewear from slipping off the user's face. Furthermore, the temple 600 may be designed to fold from the connecting member so that the temple 600 can be stored with minimal volume when the eyewear is not worn by the user.

The nose support frame 300 may be formed as the frame 200 extends from the bottom center of the lens 100 or may be formed by being coupled to the lens 100. In other words, the nose support frame 300 may be coupled to the bottom center of the lens 100, while also being part of the frame 200 coupled to the periphery of the lens 100. In addition, the nose support frame 200 may be formed separately from the frame 200, as shown in the drawings. In this case, while being separated from the frame 200, the nose support frame 200 may be coupled to a portion of the periphery of the lens 100 at the bottom center of the lens 100 at a position on the user's nose bridge. Meanwhile, both the nose support frame 300 and the frame 200 may be formed of various materials widely known in the art, such as synthetic resin, polymer resin, or metal.

The coupling portion 400 includes a plurality of coupling shafts 410 extending from the nose support frame 300 to protrude toward the user's face, extending in the vertical direction, and spaced apart from each other. In other words, the coupling portion 400 may extend from the nose support frame 300 itself to protrude, and may be formed of the same material as the nose support frame 300. The coupling portion 400 is a portion where the adjustment tip 700 coupled to the nose support pad 500 is coupled. As the adjustment tip 700 is coupled to the coupling portion 400, the coupling portion 400 may allow the adjustment tip 700 to be coupled to the nose support frame 300 of the eyewear.

The adjustment tip 700 is coupled to the coupling portion 400, thereby enabled to move in the vertical direction along the coupling shaft 410 and horizontally rotate about the coupling shaft 410. While coupling the nose support pad 500 to the coupling shaft 410, the adjustment tip 700 may allow the nose support pad 500 to move up and down relative to the nose support frame 300 (or the coupling portion 400), or allow a portion of the nose support pad 500 to move horizontally. That is, the adjustment tip 700 may function as a connecting member that intermediately connects the nose support pad 500 with the coupling portion 400 extending from the nose support frame 300. As coupled to the coupling portion 400 by the adjustment tip 700, the nose support pad 500 may be adjusted in angle horizontally. Therefore, a person with a relatively narrow nose may narrow the two ends of the nose support pad 500 to form a narrow angle, while a person with a relatively wide nose may expand the two ends of the nose support pad 500 to form a wide angle.

Meanwhile, the nose support pad 500 may be formed of various elastic or soft materials such as rubber or ethylene propylene diene monomer (EPDM). The nose support pad 500 may support the eyewear on the user's nose bridge, allowing the lens 100 to be positioned in front of the user's eyes. As shown in the drawings, the nose support pad 500 may be formed with two ends that are supported on the top of the nose, interconnected at a central point, and extending downward in a sloping manner around the center, and spaced apart from each other. Specifically, the nose support pad 500 may have a bent shape (similar to the shape of ˆ) with a connected part at the top as a reference point, and the bent part may take various forms such as a straight or curved line. However, the present disclosure is not limited thereto, and contrary to the drawings, a plurality of nose support pads positioned at the both ends of the nose bridge may be provided separately, each attached to a different adjustment tip.

Meanwhile, the nose support pad 500 may vary in size and shape and is detachable, allowing users to select different forms and sizes according to their preferences. For instance, in providing a set of eyewear, relatively large and small nose support pads 500 are provided, so that a user can select and use a desired nose support pad 500 with the appropriate size based on the user's face shape, size, or preference. If a user wishes to use a larger nose support pad, the user may attach the nose support pad to the adjustment tip 700 for use. Conversely, if a user wishes to switch to a smaller nose support pad, the user may detach the existing larger nose support pad and affix the smaller nose support pad to the adjustment tip 700.

Meanwhile, people who wear eyewear have unique facial shapes depending on each individual's condition or various races. That is, many individuals experience discomfort or find eyewear ill-fitting when purchasing mass-produced products due to variations in facial shapes and sizes or personal preferences. Furthermore, there's often difficulty in finding eyewear that matches one's personal style preferences. For example, some individuals have high noses, while others have low noses. Some may have rounded or convex nose bridges, while others may have pointed or flat noses, among other variations. Despite these challenges, a conventional eyewear typically features a nose support pad manufactured with a uniform shape and angle, regardless of individual facial characteristics. As a result, consumers end up wearing ill-fitting eyewear or attempting to find suitable ones by trying on multiple products.

Furthermore, there is an issue of decreased production efficiency in the manufacturing of eyewear products produced through mass production methods. That is, there has been an issue of inefficiency in production for manufacturers, such as producing separate products suitable for the typical facial shapes of Westerners and Asians. Furthermore, individuals who wear prescription glasses alongside eyewear such as sunglasses or goggles encounter further challenges in finding suitable eyewear.

Accordingly, in the eyewear of the present disclosure, the angle of the both ends of the nose support pad 500 may be adjusted through adjustments of the coupling portion 400 and adjustment tip 700 in order to match the shape of the user's nose bridge. Moreover, a user is able to easily adjust the position of the nose support pad 500 in the vertical direction. Thus, the user may easily adjust the eyewear to fit the shape of the user's face and position the lens to suit the user's preferences. In other words, it is possible to move the position of the nose support pad 500 upward and downward by horizontally adjusting the angle of the two ends of the nose support pad 500. This allows for easy adjustment of the nose support pad 500 in all directions.

In other words, when coupled to the adjustment tip 700, the nose support pad 500 may be moved in the vertical direction according to vertical movement of the adjustment tip 700 to change the position of the lens 100 depending on a wearer. That is, lowering the adjustment tip 700 results in a relatively higher position for the lens 100, while raising the adjustment tip 700 lowers the lens 100. In addition, by rotating the adjustment tips 700 positioned on the both sides of the user's nose bridge horizontally, a user may adjust a width between the both ends of the nose support pads 500 to fit to the shape of the user's nose bridge. Widening a distance (width) between the both ends of the nose support pad 500 by rotating the adjustment tips 700 horizontally may facilitate comfortable wearing for a person with a wider or blunt nose. Conversely, narrowing the distance (width) between the both ends of the nose support pad 500 by rotating the adjustment tips 700 horizontally may facilitate comfortable wearing for a person with a narrower and higher nose. These adjustments in the position and angle of the nose support pad 500 occur through relative movement between the adjustment tip 700 and the coupling portion 400 in response to a force transmitted through the nose support pad 500.

Meanwhile, FIG. 8 is an exploded perspective view schematically showing eyewear according to an embodiment of the present disclosure; FIG. 9 is an exploded perspective view schematically showing a portion of the nose support frame according to an embodiment of the present disclosure; and FIG. 10 is an exploded perspective view of a nose support frame according to an embodiment of the present disclosure, as viewed from a different perspective. In addition, FIG. 11 is a perspective view of an adjustment tip according to an embodiment of the present disclosure, as seen from one angle; FIG. 12 is a perspective view of an adjustment tip, as seen from another angle, and FIG. 13 is a perspective view of an adjustment tip, as seen from yet another angle. In addition, FIG. 14 shows a perspective view of the nose support frame according to an embodiment of the present disclosure as seen from one angle, and FIG. shows a perspective view of the nose support according to an embodiment of the present disclosure as seen from one angle.

Referring to FIGS. 8 to 15, the nose support frame 300 may include a lens coupling line 320 formed as a recessed area corresponding to the shape of the lens 100 so that the lens 100 can be coupled to the nose support frame 300. In addition, the nose support frame 300 may include a prescription lens fixing part 310 to allow insertion and fixation of a separate prescription lens (not shown). The prescription lens fixing part 310 may include a groove and a securing part to allow easy attachment and detachment of the prescription lens. The nose support frame 300 may have a shape (for example, the shape of ˆ or ∩) sloping downward on both sides of the top center so that the nose support frame 300 can be easily placed on the user's nose bridge. That is, the nose support frame 300 may have a shape that is inclined horizontally from the top center toward the bottom, while a distance between the both ends of the nose support frame 300 gradually increases toward the bottom. In other words, in the eyewear, the nose support frame 300 may be generally in a shape to be placed on the nose bridge.

In addition, the plurality of coupling shafts 410 of the coupling portion 400 may protrude from the both ends of the nose support frame 300 toward the user's face, sloping from top to bottom. The opposing coupling shafts 410 are symmetrical to a virtual line crossing a center of the lens in the vertical direction and spaced apart with an increasing distance therebetween from top to bottom. Like the nose support frame 300, the coupling shaft 410 may be arranged in a diagonally sloping manner from top to bottom, while arranged symmetrically. Thus, when a user wears the eyewear, the nose support pad 500 coupled to the coupling shafts 410 may be supported on the both sides and top of the user's nose bridge.

Meanwhile, the coupling shafts 410 of the coupling portion 400 are provided as a plural of shafts spaced apart from each other, and may extend to the nose support frame 300 to protrude toward the user's face and extend in a vertical direction. Elements of the coupling portion 400 may be formed by extending from the nose support frame 300 or may be formed integrally. The coupling shaft 410 may protrude upward from a surface of the nose support frame 300 to form a shaft to which the adjustment tip 700 can be coupled, and may be formed to be relatively longer in the vertical direction. In addition, the coupling shaft 410 may be formed to have a circular or curved cross section so that the adjustment tip 700 can be rotated at a predetermined angle. That is, the adjustment tip 700 may be formed with one end open so as to be coupled to the coupling shaft 410 for rotation. The adjustment tip 700 may have a space that becomes wider inwardly relative to the outermost opening. Accordingly, it is possible to engage the coupling shaft 410 in a gripping manner and enable rotation. The adjustment tip 700 may be formed of a material with a certain elasticity, such as synthetic resin, to be coupled to the coupling shaft 410.

Meanwhile, one end of the adjustment tip 700 may be coupled to the coupling shaft 410 and the other end may be coupled to the nose support pad 500. The other end of the adjustment tip 700 may further include a pad fixing part 710, which protrudes in the vertical direction and is inserted into an inner space of the support pad 500 to fix the nose support pad 500. That is, the adjustment tip 700 may include the pad fixing part 710 protruding in a direction in which the coupling shaft 410 extends, so that the adjustment tip 700 can be inserted into the coupling groove 510 recessed inward from the nose support pad 500. The pad fixing part 710 of the adjustment tip 700 may protrude toward both ends to be longer than a length of the center of the adjustment tip 700, and may be inserted into an inner coupling groove 510 of the nose support pad 500, preventing easy detachment. The inner coupling groove 510 of the nose support pad 500 may have a shape corresponding to the shapes of the center of the adjustment tip 700 and the pad fixing part 710, and may be engaged inwardly by an elastic or flexible material of the nose support pad 500, preventing easy detachment.

Meanwhile, the coupling portion 400 may include a connecting portion 420, which connects the coupling shaft 410 and the nose support frame 300 at a distance, with a thickness smaller than that of the coupling shaft 410. The connecting portion 420 ensures a space between the coupling shaft 410, to which the adjustment tip 700 is coupled, and the nose support frame 300, so that the adjustment tip 700 can be rotated about the coupling shaft 410. That is, it may be understood that the coupling shaft 410 is connected to the nose support frame 300 at both ends relative to the connecting portion 420.

In addition, the adjustment tip 700 may include a fitting portion 720 formed as an empty space of a shape corresponding to the coupling shaft 410 so as to fit to the coupling shaft 410. The fitting portion 720 refers to an empty space, and the cross section of the empty space may be in a shape corresponding to the shape of the coupling shaft 410, and the fitting portion 720 may have one end open so that the coupling shaft 410 can be inserted into the fitting portion 720. In addition, as described above, an inner space of the fitting portion 720 where the coupling shaft 410 is coupled may have a large area to prevent easy detachment when the coupling shaft 410 is inserted through the opening of the fitting portion 720, and the outermost open part may have a small area. That is, a part (corresponding to the outermost part of the fitting portion 720) where the coupling shaft 410 is initially inserted into the fitting portion 720 may have a relatively narrow open area. Thus, when the coupling shaft 410 is coupled to the coupling portion 720 in a manner of gripping the coupling shaft 410, the coupling shaft 410 may not be easily detached. For this purpose, it is preferable that a width of the opening on the outer side of the fitting portion 720 is narrower than the thickness of the central part of the coupling shaft 410 on a vertical cross-section.

In addition, the width of the opening of the fitting portion 720 where the coupling shaft 410 is inserted may be larger than the thickness of the connecting portion 420 of the coupling portion 400. Thus, a predetermined gap between the fitting portion 720 and the connecting portion 420 may be secured, preventing unnecessary interference with the rotation of the adjustment tips 700. That is, when the adjustment tip 700 is rotated (rotated to adjust the angle of the nose support pad 500) about the coupling shaft 410, it is possible to prevent interference between the adjustment tip 700 and the connecting portion 420 of the coupling portion 400 due to contact between the adjustment tip 700 and the connecting portion 420.

Meanwhile, referring to FIGS. 13 and 14, a vertical length P1 of the adjustment tip 700 coupled to the coupling shaft 410 is smaller than a vertical length P2 formed by the coupling shaft 410. That is, a portion where the adjustment tip 700 is coupled to the coupling shaft 410 may be formed to be smaller than an entire length of the coupling shaft 410 formed in the vertical direction. Accordingly, the adjustment tip 700 may be moved in the vertical direction along the coupling shaft 410, so that the position of the nose support pad 500 can be adjusted according to the movement of the adjustment tip 700.

FIG. 16 is a perspective view showing a coupling relationship between a nose support frame and an adjustment tip according to an embodiment of the present disclosure, and FIG. 17 is a cross-sectional view taken along line A-A' of FIG. 16.

Referring to FIGS. 16 and 17, and FIGS. 11 to 13 which show the adjustment tip from various angles, and FIG. 14 detailing the coupling portion, the adjustment tip 700 may further include stoppers 740 formed by a plurality of recessed areas repeatedly formed on a surface facing the coupling shaft 410 that is to be coupled to the fitting portion 720. The coupling portion 400 may further include an angle adjuster 440 formed to protrude from the coupling shaft 410 and inserted into one of the stoppers 740. The angle adjuster 440 is to be inserted into one of the plurality of stoppers 740, so that the adjustment tip 700 can be rotated partially and then stop to remain in the state.

For example, FIG. 16 is a view showing a combination between the adjustment tip and the coupling portion disposed on the right side of a user's nose, and if there is a symmetrical part on the left side of the user's nose, it is possible to adjust the angle of the adjustment tip by the angle adjuster and the stoppers. In the combination between the adjustment tip and the coupling portion disposed on the right side of the user's nose, if a plurality of stoppers 740 is formed at two positions spaced apart from each other at a predetermined distance as shown in FIG. 16, the adjustment tip 700 may have a narrow angle when the angle adjuster 440 is disposed at a stopper 740 at a first position on the left side. Next, when a predetermined force is applied to the adjustment tip 700 to move the angle adjuster 440 to a stopper 740 at a second position on the right side, the adjustment tip 700 may change in position to have a wider angle. The plurality of stoppers 740 in the adjustment tip 700 is formed, and the adjustment tip 700 may be rotated and stop as the angle adjuster 440 moves and locks into any one of the plurality of stoppers 740. Accordingly, by adjusting the angle of the adjustment tip 700, it is possible to ultimately adjust the angle of the nose support pad 500.

Meanwhile, at a position where the adjustment tip 700 and the coupling shaft 410 are coupled and contact each other, the angle adjuster 440 and the stopper 740 may be disposed inside the fitting portion 720 and face each other. That is, in the adjustment tip 700 rotating relative to the coupling shaft 410, the angle adjuster 440 and the stopper 740 are placed only inside the fitting portion 720 of the adjustment tip 700, so that the angle adjuster 440 and the stopper 740 are disposed only within the radius of rotation, thereby making it easier to adjust the angle of rotation of the adjustable tip 700 (and eventually the nose support pad). If a portion where the angle adjuster and the stopper face each other is outside the fitting portion of the adjustment tip, more force may be required to rotate the nose support pad, or there may be an issue of the adjustment tip detaching from the coupling shaft 410 during rotation of the adjustment tip. Thus, by ensuring that the angle adjuster 440 and the stopper 740 are disposed only inside the coupling portion 720 relative to the radius of rotation of the adjustment tip 700, the adjustment tip 700 may be rotated while detachment and separation of the adjustment tip 700 from the coupling shaft 410 is prevented.

Meanwhile, contrary to what is shown in the drawings, the adjustment tip may further include a stopper protruding from a surface facing the coupling shaft which is coupled to the coupling portion. The coupling portion may further include angle adjusters formed by a plurality of recessed areas repeatedly formed on the surface of the coupling shaft. The stopper may be inserted into any one of the angle adjuster so that the angle of the adjustment tip is adjusted by moving the stopper between the angle adjusters. That is, unlike the embodiments shown in the drawings, a protruding part of the adjustment tip and a recessed part of the angle adjuster of the coupling portion may be reversed.

Meanwhile, the adjustment tip 700 may be movable upward and downward along the coupling shaft 410. The adjustment tip 700 may be moved upward and downward along the coupling shaft 410 to allow the nose support pad 500 to move upwardly or downwardly on the user's nose bridge. When the adjustment tip 700 and the nose support pad 500 coupled thereto are moved upward, the nose support pad 500 may be moved relatively closer to the lens 100, thereby lowering the position of the lens 100 relative to the user. Conversely, when the adjustment tip 700 and the nose support pad 500 coupled thereto are moved downward, the nose support pad 500 may be moved further away from the lens 100 relative to the lens 100, thereby raising the position of the lens 100 relative to the user. In this way, the adjustment tip 700 may be moved upward and downward along the coupling shaft 410, so that the height of the lens 100 may be adjusted for each user.

Meanwhile, in order to allow the adjustment tip 700 to move upward and downward along the coupling shaft 410 while stably remaining in a changed position after repositioning, the adjustment tip 700 may further include a plurality of adjustment steps 730, and the coupling portion 400 may further include stopping projections 430 at positions opposite to the adjustment steps 730. That is, the adjustment tip 700 may further include the plurality of adjustment steps 730 recessed and spaced apart from each other, and the coupling portion 400 may further include the stopping projections 430 that protrude to be inserted into one of the adjustment steps 730. Using the stopping projections 430, the position of the adjustment tip 700 may be adjusted in the vertical direction.

Referring again to FIGS. 10, 11, and 12, in the coupling portion 400, the stopping projections 430 may be formed to protrude outward on the connecting portion 420, and the adjustment steps 730 may be disposed on an outward side of the coupling portion 720, with recessed areas spaced apart and repeatedly formed. In addition, when the adjustment tip 700 is coupled to the coupling portion 400, the adjustment steps 730 and the stopping projections 430 may be disposed at positions opposing each other. A stopping projection 430 may be complementarily inserted into one of the plurality of adjustment steps 730 to fix the relative positions of the adjustment tip 700 and the coupling portion 400.

To describe the relative movement of the adjustment tip 700 with respect to the coupling portion 400 in more detail, the stopping projection 430 may be inserted complementarily into one of the plurality of adjustment steps 730, such as a first adjustment step. Subsequently, if a downward force is applied from the outside to the adjustment tip 700, the stopping projection 430 may be moved to a second adjustment step spaced apart above from the first adjustment step (i.e., relatively downward movement of the adjustment tip), thereby securing the adjustment tip 700 at a lowered position. Conversely, if an upward force is applied from the outside to the adjustment tip 700, the stopping projection 430 may be moved to a third adjustment step spaced apart below the first adjustment step (i.e., relatively upward movement of the adjustment tip), thereby securing the adjustment tip 700 at a higher position.

In this way, in the present disclosure, it is possible to enable the adjustment tip 700 to rotate about the coupling shaft 410 of the coupling portion 400, thereby facilitating adjustment of the angle formed by the nose support pad 500. Also, it is possible to enable vertical movement and fixation of the adjustment tip 700 in the vertical direction of the coupling portion 400, facilitating stable adjustment of the vertical height of the lens 100. Therefore, by adjusting the position of the nose support pad 500 in various directions, it is possible for a user to conveniently wear the eyewear based on the user's facial shape, preferences, and conditions.

Meanwhile, the adjustment tip 700 may further include rotation stoppers 750 formed at both ends of the fitting portion 720 to stop the rotation when one end of the adjustment tip 700 contacts the nose support frame 300. The rotation stoppers 750 may prevent further rotation of the adjustment tip 700 after a rotation at a certain angle. The nose support pad 500 coupled to the adjustment tip 700 is intended to have the eyewear stably rest on the user's nose bridge, and it is necessary for the nose support pad 500 to maintain a certain angle according to the shape of the user's nose bridge. The eyewear of the present disclosure is configured to allow the adjustment tip 700 to rotate about the coupling shaft 410, enabling adjustment of the angle formed by the nose support pad 500.

If the adjustment tip 700 is further rotated beyond a certain angle and the angle between the nose support pads 500 facing each other become too narrow or too wide, the nose support pad 500 may fail to support on the user's nose bridge effectively. For example, if the angle between the nose support pads 500 becomes too narrow, the nose support pad 500 may not rest on the user's nose bridge. Conversely, if the angle between the nose support pads 500 becomes too wide or reaches 180°, the nose support pad 500 may not be supported on the nose bridge properly, failing to perform an intended function thereof. The rotation stoppers 750 of the present disclosure are designed to prevent the nose support pad 500 from narrowing below a certain angle or widening above a certain angle, as described above. The rotation stoppers 750 may be disposed on both sides of the coupling shaft 410 to prevent the adjustment tip 700 from rotating further beyond a specific angle.

To this end, a thickness of the rotation stopper 750 may increase toward a position facing the coupling portion 400. In other words, a surface of the rotation stopper 750 where one end of the adjustment tip 700 contacts the nose support frame 300 may be larger than an area formed by a cross section of a top. That is, a width of the thickness occupied by the rotation stopper 750 on the same horizontal line becomes thicker toward the coupling portion 400, allowing the adjustment tip 700 to rotate only within a specific rotation radius. If the adjustment tip 700 is rotated beyond a certain radius of rotation about the coupling shaft 410 by widening an area where the rotation stopper 750 protrudes from the adjustment tip 700 and faces the coupling portion 400, the stopper 750 may be supported by the coupling portion 400, preventing further rotation of the adjustment tip 700.

A direction toward the pad fixing part 710 from the fitting portion 720 of the adjustment tip 700 may be defined as a vertical direction, while a direction in which the rotation stoppers 750 face each other may be defined as a horizontal direction. The aspect ratio of the vertical direction to the horizontal direction may be defined as the aspect ratio. In this case, the aspect ratio may be gradually increased to allow the rotation stoppers 750 to move closer to the coupling portion 400, thereby adjusting the rotation radius of the adjustment tip 700 by forming a berm.

Meanwhile, FIG. 18 shows a cross-section taken along line A-A' of FIG. 16 according to another embodiment.

Referring to FIG. 18, in eyewear according to another embodiment of the present disclosure, an adjustment tip 700 may further include a pad portion 770 coupled to an inner surface of the adjustment tip 700, forming the fitting portion 720, and disposed between the inner surface of the coupling portion 720 and a surface of the coupling shaft 410. The pad portion 770 may be moved in contact with the coupling shaft when the adjustment tip 700 is rotated. The pad portion 770 may prevent foreign substances from accumulating between the adjustment tip 700 and the coupling shaft 410 during the rotation of the adjustment tip 700. The pad portion 770 may be formed of a material such as elastic rubber or soft silicone. In addition, in order to prevent detachment when the coupling shaft 410 is coupled to the inner part of the fitting portion 720, the pad portion 770 may have a thickness that decreases towards the outer part while gradually increases towards the inner part of the fitting portion 720. At least part of the pad portion 770 may contact a surface of the coupling shaft 410 within the fitting portion 720, so that foreign substances present on the surface of the coupling shaft 410 can be naturally removed when the adjustment tip 700 is rotated.

While the present disclosure has been particularly shown and described with reference to certain embodiments thereof, it will be understood by those of ordinary skill in the art that various changes in form and details may be made therein without departing from the spirit and scope of the present disclosure as defined by the appended claims and their equivalents.

What is claimed is:

1. Eyewear comprising:

a lens;

a frame coupled to a portion of a periphery of the lens;

a nose support frame formed by extending the frame from a center bottom of the lens or formed by being coupled to the lens;

a coupling portion comprising a plurality of coupling shaft that extend from the nose support frame to protrude toward a user's face, extend in a vertical direction, and are spaced apart from each other;

an adjustment tip coupled to the coupling portion to be movable in the vertical direction along the coupling shaft of the coupling portion, and rotating horizontally about the coupling shaft; and a nose support pad coupled to the adjustment tip and movable according to vertical movement and horizontal rotation of the adjustment tip, wherein the coupling portion comprises a connecting portion that connects the coupling shaft and the nose support frame at a distance, with a thickness smaller than a thickness of the coupling shaft, and the adjustment tip comprises a fitting portion formed as an empty space in a shape corresponding to a shape of the coupling shaft so as to fit to the coupling shaft, wherein the adjustment tip further comprises stoppers formed by repeating a plurality of recessed areas on a surface facing the coupling shaft coupled to the fitting portion, and the coupling portion further comprises an angle adjuster formed to protrude from the coupling shaft and be inserted into any one of the stoppers.

2. The eyewear of claim 1, wherein:

one end of the adjustment tip is coupled to the coupling shaft, and the other end is coupled to the nose support, and the other end of the adjustment tip further comprises a pad fixing part protruding in the vertical direction and inserted into an inner space of the nose support to fix the nose support.

3. The eyewear of claim 1, wherein the plurality of coupling shaft of the coupling portion protrude from both ends of the nose support frame toward the user's face, sloping from top to bottom, and the coupling shafts oppose each other and are symmetrical to a virtual line crossing a center of the lens in the vertical direction and spaced apart with an increasing distance therebetween from top to bottom.

4. The eyewear of claim 1, wherein an opening of the fitting portion into which the coupling shaft of the adjustment tip is inserted has a width greater than a thickness of the connecting portion of the coupling portion.

5. The eyewear of claim 1, wherein at a position where the adjustment tip and the coupling shaft are coupled to each other, the angle adjuster and the stoppers are disposed inside the fitting portion to face each other.

6. The eyewear of claim 1, wherein a vertical length of the adjustment tip coupled to the coupling shaft is smaller than a vertical length formed by the coupling shaft.

7. The eyewear of claim 1, wherein the adjustment tip is movable upward and downward along the coupling shaft.

8. The eyewear of claim 1, wherein:

the adjustment tip further comprises a pad portion coupled to an inner surface of the adjustment tip, forming the fitting portion, and disposed between the inner surface of the coupling portion and a surface of the coupling shaft, and the pad portion is moved in contact with the coupling shaft when the adjustment tip is rotated.

9. Eyewear comprising:

a lens;

a frame coupled to a portion of a periphery of the lens;

a nose support frame formed by extending the frame from a center bottom of the lens or formed by being coupled to the lens;

a coupling portion comprising a plurality of coupling shaft that extend from the nose support frame to protrude toward a user's face, extend in a vertical direction, and are spaced apart from each other;

an adjustment tip coupled to the coupling portion to be movable in the vertical direction along the coupling shaft of the coupling portion, and rotating horizontally about the coupling shaft; and a nose support pad coupled to the adjustment tip and movable according to vertical movement and horizontal rotation of the adjustment tip, wherein the coupling portion comprises a connecting portion that connects the coupling shaft and the nose support frame at a distance, with a thickness smaller than a thickness of the coupling shaft, the adjustment tip comprises a fitting portion formed as an empty space in a shape corresponding to a shape of the coupling shaft so as to fit to the coupling shaft, the adjustment tip further comprises a stopper protruding from a surface facing the coupling shaft coupled to the fitting portion, the coupling portion further comprises angle adjusters formed by repeatedly forming a plurality of recessed areas on the surface of the coupling shaft, and the stopper is inserted into any one of the angle adjusters so that an angle of the adjustment tip is adjusted by moving the stopper between the angle adjusters.

10. Eyewear comprising:

a lens;

a frame coupled to a portion of a periphery of the lens;

a nose support frame formed by extending the frame from a center bottom of the lens or formed by being coupled to the lens;

a coupling portion comprising a plurality of coupling shaft that extend from the nose support frame to protrude toward a user's face, extend in a vertical direction, and are spaced apart from each other;

an adjustment tip coupled to the coupling portion to be movable in the vertical direction along the coupling shaft of the coupling portion, and rotating horizontally about the coupling shaft; and a nose support pad coupled to the adjustment tip and movable according to vertical movement and horizontal rotation of the adjustment tip, wherein the coupling portion comprises a connecting portion that connects the coupling shaft and the nose support frame at a distance, with a thickness smaller than a thickness of the coupling shaft, the adjustment tip comprises a fitting portion formed as an empty space in a shape corresponding to a shape of the coupling shaft so as to fit to the coupling shaft, the adjustment tip further comprises rotation stoppers formed at both ends of the fitting portion to stop rotation of the adjustment tip when one end of the adjustment tip contacts the nose support frame, and a thickness of the rotation stoppers increases toward a position facing the coupling portion.

11. The eyewear of claim 10, wherein a surface of the rotation stopper where one end of the adjustment tip contacts the nose support frame is larger than an area formed by a cross section of a top.

12. Eyewear comprising:

a lens;

a frame coupled to a portion of a periphery of the lens;

a nose support frame formed by extending the frame from a center bottom of the lens or formed by being coupled to the lens;

a coupling portion comprising a plurality of coupling shaft that extend from the nose support frame to protrude toward a user's face, extend in a vertical direction, and are spaced apart from each other;

an adjustment tip coupled to the coupling portion to be movable in the vertical direction along the coupling shaft of the coupling portion, and rotating horizontally about the coupling shaft; and a nose support pad coupled to the adjustment tip and movable according to vertical movement and horizontal rotation of the adjustment tip, wherein the coupling portion comprises a connecting portion that connects the coupling shaft and the nose support frame at a distance, with a thickness smaller than a thickness of the coupling shaft, and the adjustment tip comprises a fitting portion formed as an empty space in a shape corresponding to a shape of the coupling shaft so as to fit to the coupling shaft, the adjustment tip further comprises a plurality of adjustment steps spaced apart from each other and recessed, the adjustment tip is movable upward and downward along the coupling shaft, the coupling portion further comprises a protruding stopping projection to be inserted into one of the adjustment steps, and a position of the adjustment tip is adjusted in the vertical direction by the stopping projection.

13. The eyewear of claim 12, wherein:

the stopping projection is inserted complementarily into a first adjustment step among the plurality of adjustment steps, the adjustment tip is moved and secured to a lower position as the stopping projection is moved and fixed to a second adjustment step spaced apart from above the first adjustment step, and the adjustment tip is moved and secured to a higher position as the stopping projection is moved and fixed to a third adjustment step spaced apart from below the first adjustment step.

* * * * *